US012757916B2

(12) United States Patent
Gupta et al.

(10) Patent No.: US 12,757,916 B2
(45) Date of Patent: Oct. 13, 2026

(54) POULTRY HERBAL FEED COMPOSITION FOR PRODUCING HIGH CALCIUM CONTAINING EGGS

(71) Applicants: Aditya Kishor Gupta, Bhopal (IN); Disha Gupta, Bhopal (IN)

(72) Inventors: Aditya Kishor Gupta, Bhopal (IN); Disha Gupta, Bhopal (IN)

( * ) Notice: Subject to any disclaimer, the term of this patent is extended or adjusted under 35 U.S.C. 154(b) by 740 days.

(21) Appl. No.: 18/083,647

(22) Filed: Dec. 19, 2022

(65) Prior Publication Data

US 2024/0196930 A1 Jun. 20, 2024

(51) Int. Cl.
*A23K 10/30* (2016.01)
*A23K 50/75* (2016.01)

(52) U.S. Cl.
CPC .............. *A23K 10/30* (2016.05); *A23K 50/75* (2016.05)

(58) Field of Classification Search
CPC ................................ A23K 10/30; A23K 50/75
USPC .......................................................... 426/630
See application file for complete search history.

(56) References Cited

U.S. PATENT DOCUMENTS

| | | | | |
|---|---|---|---|---|
| 2014/0072658 | A1* | 3/2014 | Ivkovic | A61K 36/81 424/724 |
| 2014/0273048 | A1* | 9/2014 | McKinney | C12Q 1/37 435/23 |
| 2019/0116833 | A1* | 4/2019 | Friesen | A23K 10/18 |

OTHER PUBLICATIONS

Gungor et al., Effect of raw and fermented grape seed on growth performance, antioxidant capacity, and cecal microflora in broiler chickens, Animal 15, 4, 2021, 100194 (Gungor).*

* cited by examiner

*Primary Examiner* — Nikki H. Dees
*Assistant Examiner* — Philip A Dubois
(74) *Attorney, Agent, or Firm* — Nitin Kaushik

(57) ABSTRACT

The present invention relates to a poultry herbal feed composition for producing eggs characterized by high calcium content. The present invention more particularly relates to the poultry herbal feed composition comprising of a) a plurality of plant extracts; b) a plurality of herbal extract, c) a plurality of pure spices, d) a plurality of algal extract, and e) a Resveratrol grapeseed extract. The composition of the present invention produces eggs with higher nutritional value and high calcium levels in comparison to conventional regular eggs.

10 Claims, No Drawings

POULTRY HERBAL FEED COMPOSITION FOR PRODUCING HIGH CALCIUM CONTAINING EGGS

BACKGROUND

Technical Field of Invention

The embodiments herein generally relate to a herbal poultry feed composition and particularly to a herbal feed composition for battery caged layered chickens for producing high calcium containing eggs.

Description of Related Art

The primary role of diet is to provide enough nutrients to meet metabolic requirements while giving the consumer a feeling of satisfaction and well-being. Recent it is found that beyond meeting nutrition needs, diet may modulate various functions in the body and may play detrimental or beneficial roles in some diseases. In the industrialized world, the concepts in nutrition are changing significantly. Now-a-days, concepts in nutrition are expanding from the past emphasis on survival, hunger satisfaction, and preventing adverse effects to an emphasis on the use of foods to promote a state of well-being and better health and to help reduce the risk of diseases. It is these research efforts that have led to the global interest in the growing food category now recognized as "functional foods."

Functional foods can be considered to be those whole, fortified, enriched or enhanced foods that provide health benefits beyond the provision of essential nutrients (e.g., vitamins and minerals), when they are consumed at efficacious levels as part of a varied diet on a regular basis. In contrast to conventional foods, functional foods, however, have demonstrated physiological benefits and can reduce the risk of chronic disease beyond basic nutritional functions, including maintenance of gut health.

In keeping pace with the progress and changing food habits, the demand for animal-based food products is growing across the world, and many are consciously consuming a protein-rich diet. Therefore, it is almost impossible to dramatically reduce the consumption of animal food. Eggs are considered as one of the highest consumed animal foods. Eggs are of particular interest from a nutritional point of view, gathering essential lipids, proteins, vitamins, minerals, and trace elements, while offering a moderate calorie source (about 140 kcal/100 g), great culinary potential, and low economic cost. Indeed, eggs have been identified to represent the lowest-cost animal source for proteins, vitamin A, iron, vitamin B12, riboflavin, choline, and the second lowest-cost source for zinc and calcium. However, regular conventional eggs are not regarded as a functional food because single conventional egg contain on an average 25 mg of calcium.

Calcium is essential for nearly every process in the body. Human body holds an abundance of calcium. Around 99% of this mineral is stored in your bones and teeth. The other 1% is in your blood and soft tissues. Human body can't produce calcium, although calcium is better absorbed from foods and supplements. Eating foods rich in calcium is critical to growing and maintaining strong bones. It's also an important nutrient for healthy cell function. Human body requires calcium to support muscle and nerve function, regulate blood pressure and hormone levels, as well as facilitate communication between cells. So, maintaining an appropriate level of calcium in body is very important for health. Therefore, in recent years, researcher have gained interest into developing food products with superior health quality by enriching poultry meat and eggs with beneficial nutrients.

The nutritional value of raw materials available to livestock is closely linked to the quality and size of the microbial flora especially in the host animal digestive tract and its environment. Unlike ruminants, poultry do not have a natural bacterial flora capable of degrading all nutrients. These animals are characterized by a resistor and a limited immunity against infection due to colonization by pathogenic microorganisms. This is why, the use of Antibiotic Growth Promoter (AGPs) for the inhibition of pathogenic bacteria has been recommended in order to improve production performance and animal health.

Various kinds of antibiotics have been used extensively as growth promoters in animal feeds for a large number of years, especially in the fields of poultry production. The use of antibiotics in poultry feed as a growth promoter is beneficial in improvement of production parameters and diseases prevention. However, this large utilization has led to the increasing resistance of pathogens to antibiotics and the accumulation of antibiotic residues in animal products and in the environment. As a result of the decision to ban of the antibiotics in livestock production, researches on plant extracts as alternatives to the use of growth promoters (antibiotics) has significantly increased.

Many novel natural candidate replacements including probiotics, prebiotics, organic acids and plant extracts and essential oils have been applied to maintain good production. Recently, herb and plant extracts have been received a great attention to be fed to poultry as feed additives to improve and increase production. The use of herbal or plant extracts in poultry feed is gaining importance in animal production due to ban on use of certain antibiotics, harmful residual effects and cost effectiveness. The use of herbal or plant extracts in poultry feed to improve the efficiency of growth and/or eggs production, prevent disease and improve feed utilization is a strategy to improve the efficiency of the poultry industry.

Plant extracts consists mainly of proteins, peptides, oligosaccharides, fatty acids, vitamins, micro minerals. Plant extracts have a wide range of activities and their active secondary plant metabolites typically belong to the classes of isoprene derivatives and flavonoids. They are loaded with several bioactive chemicals or phytochemicals as part of their normal metabolic activities. The beneficial effects of phytochemicals could be attributed to their antimicrobial, antiviral, antifungal and antioxidant properties. Phytochemicals (such as flavonoids, phenols, saponin, alkaloids etc.) performs multiple biological activities in animals, such activities include improving performance, increased proliferations of immune cells, relief from intestinal challenge, reduction in oxidative stress, reduced mortality and increased antibody titer. The possible mechanisms of action of herb in the poultry animals or birds for growth promotion include changes in the intestinal microbiota, increased digestibility and nutrient absorption; enhanced nitrogen absorption, improvement of the immune response morphological and histological modifications of the gastrointestinal tract and antioxidant activity. Herbs can contribute to the nutrient requirements of the animals and stimulate the endocrine system and intermediate nutrient metabolism. Also, plant extracts or herbs are considered as safe, cost effective and environment friendly without any side effects. Hence, their inclusion in the diet should be encouraged to enhance the bird's performance, meat and egg quality, improve feed utilization, maintain health and alleviate adverse effect of environmental stress.

The herbal feed compositions or poultry feed additives disclosed in prior arts have failed to address poultry herbal feed composition that helps layer poultry birds to lay eggs with high calcium content.

Hence, in view of foregoing, there is a need to develop a poultry herbal feed composition for layer poultry birds. Furthermore, there is a need to develop a poultry herbal feed composition for layer poultry birds that helps them to produce eggs with high calcium content in comparison to calcium content in conventional regular eggs resulting in higher nutritional value in human when consumed.

The value additions and above-mentioned shortcomings, disadvantages and problems are addressed herein, as detailed below.

SUMMARY OF THE INVENTION

The primary object of the present invention is to provide a novel poultry herbal feed composition for battery caged layered hens for producing eggs having high calcium content as compared to conventional eggs.

Another object of the present invention is to provide an herbal poultry feed composition for producing eggs having more than twice the amount of calcium content in conventional regular eggs.

Yet another object of the present invention is to provide a poultry herbal feed composition for layers or battery caged chickens comprising a combination of plant extracts, a combination of herbal extracts, a combination of pure spices, a combination of algal extracts, and resveratrol grape seed extract.

Yet another object of the present invention is to provide a poultry herbal feed composition that helps the layer poultry birds to produce the eggs free from bad odour.

Yet another object of the present invention is to provide a poultry herbal feed composition that is blended with feed of layer poultry birds.

The embodiments of the present invention provide a novel herbal poultry feed composition for producing eggs having high calcium content. The composition comprises (a) a plurality of plant extracts, (b) a plurality of herbal extracts, (c) a plurality of pure spices, (d) a plurality of algal extract, and (e) a Resveratrol grapeseed extract.

According to an embodiment of the present invention, the plant extracts are present in an amount of 20 mg per kg of feed.

According to an embodiment of the present invention, the plant extracts and the herbal extracts are 10:1 ratio extract.

According to an embodiment of the present invention, the herbal extracts are present in an amount of 20 mg per kg of feed.

According to an embodiment of the present invention, the pure spices are turmeric, black pepper, garlic, methi and jeera.

According to an embodiment of the present invention, the turmeric is present in an amount of 2 grams per kg feed.

According to an embodiment of the present invention, the black pepper is present in an amount of 200 mg per kg feed.

According to an embodiment of the present invention, the garlic, the methi and the jeera are present in an amount of 300 mg per kg feed.

According to an embodiment of the present invention, the plurality of algal extracts are *chlorella* extract and a *spirulina* extract.

According to an embodiment of the present invention, the algal extract is present in an amount of 20 mg per kg of feed.

According to an embodiment of the present invention, the resveratrol grapeseed extract is a 100:1 ratio extract.

According to an embodiment of the present invention, the resveratrol grapeseed extract is present in an amount of 1.2 mg per kg of feed.

According to an embodiment of the present invention, the eggs produced thereof are rich in calcium content in comparison to conventional eggs.

According to an embodiment of the present invention, the calcium content in fortified eggs is more than twice the amount of calcium content in conventional regular eggs.

According to an embodiment of the present invention, the eggs are free from bad odour.

According to an embodiment of the present invention, the composition is effective for battery caged chickens.

According to an embodiment of the present invention, the combination of plant extracts are selected from group of sage leaf extract, water cress extract, ajwain extract, *Solanum nigrum* extract, *Asteracantha longifolia* extract, *moringa* extract, kale extract, shilajit extract, *Solanum glaucophyllum* extract, sea buck thorn extract, chia seeds extract, kelp extract, flax seed extract, *Kalanchoe pinnata* extract, *Picralima nitida* extract, elderberry extract, *Justicia adhatoda* extract, eyebright extract and parsley extract.

According to an embodiment of the present invention, the combination of herbal extracts are selected from group of mulethi extract, oregano extract, clove extract, rosemary extract, *Thymus vulgaris* (thyme) extract, green tea extract, *Cichorium intybus* (chicory) extract, *Berberis asiatica* extract, *Crinum jagus* extract, *Momordica charantia* extract, *Terminalia arjuna* (*arjuna*) extract, *Terminalia chebula* extract, lemon grass extract, tea tree extract, cinnamon extract, wild mint extract, pepper mint extract, quebracho tannin extract, chest nut extract, neem extract, wood apple extract, long pepper extract, *stevia* extract, *Humulus lupulus* extract, icariin extract, giloy extract, *Lepidium sativum* (chandrashoor) extract, *Laurus nobilis* (bay leaf) extract, marshmallow extract, *Acacia nilotica* extract, *Ganoderma lucidum* (*reishi* mushroom) extract, okro *Abelmoschus esculentus* (okra) extract, onion extract, *Arbutus unedo* extract, *Uva ursi* extract, pomegranate extract, *Pluchea lanceolata* (*rasna*) extract, *Hypecoum erectum* L. extract, ash gourd (winter melon) extract, dandelion extract, *Silybum marianum* (milk thistle) extract, *Boerhaavia difusa* (*punarnava*) extract, *Ipomoea digitata* extract, *Phyllanthus niruri* extract, *Picrorhiza kurroa* extract, *Swertia* chirayita extract, *Eclipta alba* extract, *Hemidesmus indicus* extract, *Tephrosia purpurea* (sarpunkha) extract, *Fumaria indica* extract, *symplocos racemose* extract, *Amorphophallus konjac* (glucomannan) extract, sweet flag extract, methi extract, monacolin extract, olive extract, *cordyceps* extract, *Nigella sativa* (kalongi) extract, *Tinospora cordifolia* (guduchi) extract, *Juglans nigra* (black walnut) extract, *ginkgo* (*Ginkgo biloba*) extract, *Coriandrum sativum* (coriander) extract, *Leptadenia reticulata* (jeevanthi) extract, *Asparagus racemosus* (shatavari) extract, *Petroselinum crispum* (parsley) extract, *Chlorophytum borivilianum* (safed musli) extract, *Tribulus terrestric* extract, saw palmetto extract, *Uraria picta* extract, *Cestrum diurnum* extract, *Vitex negundo* linn. extract, *Scutellaria baicalensis* extract, *Pinus densiflora* extract, *Allium tuberosum* extract, *Portulaca oleracea* extract, *Solanum xanthocarpum* extract, *Muira puama* extract, *Scutellaria baicalensis* (chinese skullcap) extract, *Apium graveolens* (celery) extract, *Cynara cardunculus* (artichoke) extract, *Medicago sativa* (alfalfa), *Centella asiatica* (gotu kola) extract, red spinach extract, beetroot extract, *Carica papaya* extract, *Capsicum annum* extract, *Thuja occidentalis* extract, euganol extract, *Mesua ferrea* linn. extract, lavender extract, pimpinellaanisum (anise) extract, *Anethum graveolens* (dill) extract, *Rhapidophyllum hystrix* (needle palm) extract, black cardamom extract, *Echinacea purpurea* extract, aloe vera extract, *tulsi* extract, *Astragalus propinquus* extract, dong quai extract, *Eugenia jambolana* extract, nettle leaf extract, worm wood extract, nettle extract, *Propolis* extract, *Aralia racemosa* (spikenard) extract, *Scutellaria baicalensis* (baikal skullcap) extract, *Hydrastis canadensis* (goldenseal) extract, *Cyperus rotundus* extract, cayenne pepper extract, *Bergenia ligulata* extract, *Allium cepa* extract, *Schizandrae fructus* extract, ashwagandha extract, *Dioscorea villosa* (wild yam) extract, licorice extract, *Tanacetum parthenium* (feverfew) extract, comfrey bark extract, *Cissus quadrangularis* extract, *Carum carvi* L. (caraway) extract, St. john's wort extract, hesperdine extract and *Andrographis* paniculate extract.

According to an embodiment of the present invention, the feed composition is blended with feed of layer poultry birds.

According to an embodiment of the present invention, the Resveratrol grapeseed extract is blended with feed of layer poultry birds in a ratio 100:1.

According to an embodiment of the present invention, the Resveratrol grapeseed extract is present in an amount 1.2 mg per kg weight of feed.

According to an embodiment of the present invention, the herbal extracts of mulethi extract, oregano extract, clove extract, rosemary extract, *Thymus vulgaris* (thyme) extract, green tea extract, *Cichorium intybus* (chicory) extract, *Berberis asiatica* extract, *Crinum jagus* extract, *Momordica charantia* extract, *Terminalia arjuna* (*arjuna*) extract, *Terminalia chebula* extract, lemon grass extract, tea tree extract, cinnamon extract, wild mint extract, pepper mint extract, quebracho tannin extract, chest nut extract, neem extract, wood apple extract, long pepper extract, *stevia* extract, *Humulus lupulus* extract, icariin extract, giloy extract, *Lepidium sativum* (chandrashoor) extract, *Laurus nobilis* (bay leaf) extract, marshmallow extract, *Acacia nilotica* extract, *Ganoderma lucidum* (*reishi* mushroom) extract, okro *Abelmoschus esculentus* (okra) extract, onion extract, *Arbutus unedo* extract, *Uva ursi* extract, pomegranate extract, *Pluchea lanceolata* (*rasna*) extract, *Hypecoum erectum* L. extract, ash gourd (winter melon) extract, dandelion extract, *Silybum marianum* (milk thistle) extract, *Boerhaavia diffusa* (*punarnava*) extract, *Ipomoea digitata* extract, *Phyllanthus niruri* extract, *Picrorhiza kurroa* extract, *swertia* chirayita extract, *Eclipta alba* extract, *Hemidesmus indicus* extract, *Tephrosia purpurea* (sarpunkha) extract, *Fumaria indica* extract, *symplocos racemose* extract, *Amorphophallus konjac* (glucomannan) extract, sweet flag extract, *arjuna* extract, methi extract, monacolin extract, olive extract, *cordyceps* extract, *Nigella sativa* (kalongi) extract, *Tinospora cordifolia* (guduchi) extract, *Juglans nigra* (black walnut) extract, *ginkgo* (*Ginkgo biloba*) extract, *Coriandrum sativum* (coriander) extract, *Leptadenia reticulata* (jeevanthi) extract, *Asparagus racemosus* (shatavari) extract, *Petroselinum crispum* (parsley) extract, *Chlorophytum borivilianum* (safed musli) extract, *Tribulus terrestric* extract, saw palmetto extract, *Uraria picta* extract, *Cestrum diurnum* extract, *Vitex negundo* linn. extract, *Scutellaria baicalensis* extract, *Pinus densiflora* extract, *Allium tuberosum* extract, *Portulaca oleracea* extract, *Solanum xanthocarpum* extract, *Muira* puama extract, *Scutellaria baicalensis* (chinese skullcap) extract, *Apium graveolens* (celery) extract, *Cynara cardunculus* (artichoke) extract, *Medicago sativa* (alfalfa). *Centella asiatica* (gotu kola) extract, red spinach extract, beetroot extract, *Carica papaya* extract, *capsicum* annum extract, *Thuja occidentalis* extract, euganol extract, *Mesua ferrea* linn. extract, lavender extract, pimpinellaanisum (anise) extract, *Anethum graveolens* (dill) extract, *Rhapidophyllum hystrix* (needle palm) extract, black cardamom extract, *Echinacea purpurea* extract, aloe vera extract, *tulsi* extract, *Astragalus propinquus* extract, dong quai extract, *Eugenia jambolana* extract, nettle leaf extract, worm wood extract, nettle extract, *Propolis* extract, *Aralia racemosa* (spikenard) extract, *Scutellaria baicalensis* (baikal skullcap) extract, *Hydrastis canadensis* (goldenseal) extract, *Cyperus rotundus* extract, cayenne pepper extract, *Bergenia ligulata* extract, *Allium cepa* extract, *Schizandrae fructus* extract, ashwagandha extract, *Dioscorea villosa* (wild yam) extract, licorice extract, *Tanacetum parthenium* (feverfew) extract, comfrey bark extract, *Cissus quadrangularis* extract, *Carum carvi* L. (caraway) extract, St. john's wort extract, hesperdine extract, *Andrographis* paniculate extract are present in an amount 20.0 mg per kg weight of feed.

According to an embodiment of the present invention, the plant extracts of sage leaf extract, water cress extract, ajwain extract, *Solanum nigrum* extract, *Asteracantha longifolia* extract, *moringa* extract, kale extract, shilajit extract, *Solanum glaucophyllum* extract, sea buck thorn extract, chia seeds extract, kelp extract, flax seed extract, *Kalanchoe pinnata* extract, *Picralima nitida* extract, elderberry extract, *Justicia adhatoda* extract, eyebright extract and parsley extract are present in an amount 20.0 mg per kg weight of feed.

According to an embodiment of the present invention, the turmeric is present in an amount 2.0 grams per kg weight of feed.

According to an embodiment of the present invention, the black pepper is present in an amount 200.0 mg per kg weight of feed.

According to an embodiment of the present invention, the garlic is present in an amount 300.0 mg per kg weight of feed.

According to an embodiment of the present invention, the methi is present in an amount 300.0 mg per kg weight of feed.

According to an embodiment of the present invention, the jeera is present in an amount 300.0 mg per kg weight of feed.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

DETAILED DESCRIPTION OF THE EMBODIMENTS

In the following detailed description, a reference is made to the accompanying drawings that form a part hereof, and in which the specific embodiments that may be practiced is shown by way of illustration. The embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments of the present provide a novel poultry herbal feed composition for producing eggs with high calcium content for the battery caged chicken. There is no bad odour in these eggs. The eggs produced with the feed composition of the present invention causes no secondary infection and are safe to be consumed by allergic people.

According to an embodiment herein, a novel herbal poultry feed composition for producing eggs having high calcium content is provided. The calcium content in fortified eggs is more than twice the amount of calcium content in conventional regular eggs. The composition comprises (a) a plurality of plant extracts, (b) a plurality of herbal extracts, (c) a plurality of pure spices, (d) a plurality of algal extracts, and (e) a Resveratrol grapeseed extract.

According to an embodiment herein, the plant extracts are present in an amount of 20 mg per kg of feed.

According to an embodiment herein, the plant extracts and the herbal extracts are 10:1 ratio extract.

According to an embodiment herein, the herbal extracts are present in an amount of 20 mg per kg of feed.

According to an embodiment herein, the pure spices are turmeric, black pepper, garlic, methi and jeera.

According to an embodiment herein, the turmeric is present in an amount of 2 grams per kg feed.

According to an embodiment herein, the black pepper is present in an amount of 200 mg per kg feed.

According to an embodiment herein, the garlic, the methi and the jeera are present in an amount of 300 mg per kg feed.

According to an embodiment herein, the plurality of algal extracts are *chlorella* extract and a *spirulina* extract.

According to an embodiment herein, the algal extract is present in an amount of 20 mg per kg of feed.

According to an embodiment herein, the resveratrol grapeseed extract is a 100:1 ratio extract.

According to an embodiment herein, the resveratrol grapeseed extract is present in an amount of 1.2 mg per kg of feed.

According to an embodiment herein, the eggs produced thereof are rich in calcium content in comparison to conventional eggs.

According to an embodiment herein, the calcium content in fortified eggs is more than twice the amount of calcium present in conventional regular eggs.

According to an embodiment herein, the eggs are free from bad odour.

According to an embodiment herein, the composition is effective for battery caged chickens.

According to an embodiment herein, the combination of plant extracts are selected from group of sage leaf extract, water cress extract, ajwain extract, *Solanum nigrum* extract, *Asteracantha longifolia* extract, *moringa* extract, kale extract, shilajit extract, *Solanum glaucophyllum* extract, sea buck thorn extract, chia seeds extract, kelp extract, flax seed extract, *Kalanchoe pinnata* extract, *Picralima nitida* extract, elderberry extract, *Justicia adhatoda* extract, eyebright extract and parsley extract.

According to an embodiment herein, the combination of herbal extracts are selected from group of mulethi extract, oregano extract, clove extract, rosemary extract, *Thymus vulgaris* (thyme) extract, green tea extract, *Cichorium intybus* (chicory) extract, *Berberis asiatica* extract, *Crinum jagus* extract, *Momordica charantia* extract, *Terminalia arjuna* (*arjuna*) extract, *Terminalia chebula* extract, lemon grass extract, tea tree extract, cinnamon extract, wild mint extract, pepper mint extract, quebracho tannin extract, chest nut extract, neem extract, wood apple extract, long pepper extract, *stevia* extract, *Humulus lupulus* extract, icariin extract, giloy extract, *Lepidium sativum* (chandrashoor) extract, *Laurus nobilis* (bay leaf) extract, marshmallow extract, *Acacia nilotica* extract, *Ganoderma lucidum* (*reishi* mushroom) extract, okro *Abelmoschus esculentus* (okra) extract, onion extract, *Arbutus unedo* extract, *Uva ursi* extract, pomegranate extract, *Pluchea lanceolata* (*rasna*) extract, *Hypecoum erectum* L. extract, ash gourd (winter melon) extract, dandelion extract, *Silybum marianum* (milk thistle) extract, *Boerhaavia difusa* (*punarnava*) extract, *Ipomoea digitata* extract, *Phyllanthus niruri* extract, *Picrorhiza kurroa* extract, *swertia* chirayita extract, *Eclipta alba* extract, *Hemidesmus indicus* extract, *Tephrosia purpurea* (sarpunkha) extract, *Fumaria indica* extract, *symplocos racemose* extract, *Amorphophallus konjac* (glucomannan) extract, sweet flag extract, *arjuna* extract, methi extract, monacolin extract, olive extract, *cordyceps* extract, *Nigella sativa* (kalongi) extract, *Tinospora cordifolia* (guduchi) extract, *Juglans nigra* (black walnut) extract, *ginkgo* (*Ginkgo biloba*) extract, *Coriandrum sativum* (coriander) extract, *Leptadenia reticulata* (jeemanthi) extract, *Asparagus racemosus* (shatavari) extract, *Petroselinum crispum* (parsley) extract, *Chlorophytum borivilianum* (safed mush) extract, *Tribulus terrestric* extract, saw palmetto extract, *Uraria picta* extract, *Cestrum diurnum* extract, *Vitex negundo* linn. extract, *Scutellaria baicalensis* extract, *Pinus densiflora* extract, *Allium tuberosum* extract, *Portulaca oleracea* extract, *Solanum xanthocarpum* extract, *Muira puama* extract, *Scutellaria baicalensis* (chinese skullcap) extract, *Apium graveolens* (celery) extract, *Cynara cardunculus* (artichoke) extract, *Medicago sativa* (alfalfa). *Centella asiatica* (gotu kola) extract, red spinach extract, beetroot extract, *Carica papaya* extract, *capsicum* annum extract, *Thuja occidentalis* extract, euganol extract, *Mesua ferrea* linn. extract, lavender extract, pimpinellaanisum (anise) extract, *Anethum graveolens* (dill) extract, *Rhapidophyllum hystrix* (needle palm) extract, black cardamom extract, *Echinacea purpurea* extract, aloe vera extract, *tulsi* extract, *Astragalus propinquus* extract, dong quai extract, *Eugenia jambolana* extract, nettle leaf extract, worm wood extract, nettle extract, *Propolis* extract, *Aralia racemosa* (spikenard) extract, *Scutellaria baicalensis* (baikal skullcap) extract, *Hydrastis canadensis* (goldenseal) extract, *Cyperus rotundus* extract, cayenne pepper extract, *Bergenia ligulata* extract, *Allium cepa* extract, *Schizandrae fructus* extract, ashwagandha extract, *Dioscorea villosa* (wild yam) extract, licorice extract, *Tanacetum parthenium* (feverfew) extract, comfrey bark extract, *Cissus quadrangularis* extract, *Carum carvi* L. (caraway) extract, St. john's wort extract, hesperdine extract and *Andrographis* paniculate extract.

According to an embodiment herein, the feed composition is blended with feed of layer poultry birds.

According to an embodiment herein, the Resveratrol grapeseed extract is blended with feed of layer poultry birds in a ratio 100:1.

According to an embodiment herein, the Resveratrol grapeseed extract is present in an amount 1.2 mg per kg weight of feed.

According to an embodiment herein, the herbal extracts of mulethi extract, oregano extract, clove extract, rosemary extract, *Thymus vulgaris* (thyme) extract, green tea extract, *Cichorium intybus* (chicory) extract, *Berberis asiatica* extract, *Crinum jagus* extract, *Momordica charantia* extract, *Terminalia arjuna* (*arjuna*) extract, *Terminalia chebula* extract, lemon grass extract, tea tree extract, cinnamon extract, wild mint extract, pepper mint extract, quebracho tannin extract, chest nut extract, neem extract, wood apple extract, long pepper extract, *stevia* extract, *Humulus lupulus* extract, icariin extract, giloy extract, *Lepidium sativum* (chandrashoor) extract, *Laurus nobilis* (bay leaf) extract, marshmallow extract, *Acacia nilotica* extract, *Ganoderma lucidum* (*reishi* mushroom) extract, okro *Abelmoschus esculentus* (okra) extract, onion extract, *Arbutus unedo* extract, *Uva ursi* extract, pomegranate extract, *Pluchea lanceolata* (*rasna*) extract, *Hypecoum erectum* L. extract, ash gourd (winter melon) extract, dandelion extract, *Silybum marianum* (milk thistle) extract, *Boerhaavia diffusa* (*punarnava*) extract, *Ipomoea digitata* extract, *Phyllanthus niruri* extract, *Picrorhiza kurroa* extract, *swertia* chirayita extract, *Eclipta alba* extract, *Hemidesmus indicus* extract, *Tephrosia purpurea* (sarpunkha) extract, *Fumaria indica* extract, *symplocos racemose* extract, *Amorphophallus konjac* (glucomannan) extract, sweet flag extract, methi extract, monacolin extract, olive extract, *cordyceps* extract, *Nigella sativa* (kalongi) extract, *Tinospora cordifolia* (guduchi) extract, *Juglans nigra* (black walnut) extract, *ginkgo* (*Ginkgo biloba*) extract, *Coriandrum sativum* (coriander) extract, *Leptadenia reticulata* (jeevanthi) extract, *Asparagus racemosus* (shatavari) extract, *Petroselinum crispum* (parsley) extract, *Chlorophytum borivilianum* (safed musli) extract, *Tribulus terrestric* extract, saw palmetto extract, *Uraria picta* extract, *Cestrum diurnum* extract, *Vitex negundo* linn. extract, *Scutellaria baicalensis* extract, *Pinus densiflora* extract, *Allium tuberosum* extract, *Portulaca oleracea* extract, *Solanum xanthocarpum* extract, *Muira puama* extract, *Scutellaria baicalensis* (chinese skullcap) extract, *Apium graveolens* (celery) extract, *Cynara cardunculus* (artichoke) extract, *Medicago sativa* (alfalfa). *Centella asiatica* (gotu kola) extract, red spinach extract, beetroot extract, *Carica papaya* extract, *capsicum* annum extract, *Thuja occidentalis* extract, euganol extract, *Mesua ferrea* linn. extract, lavender extract, pimpinellaanisum (anise) extract, *Anethum graveolens* (dill) extract, *Rhapidophyllum hystrix* (needle palm) extract, black cardamom extract, *Echinacea purpurea* extract, aloe vera extract, *tulsi* extract, *Astragalus propinquus* extract, dong quai extract, *Eugenia jambolana* extract, nettle leaf extract, worm wood extract, nettle extract, *Propolis* extract, *Aralia racemosa* (spikenard) extract, *Scutellaria baicalensis* (baikal skullcap) extract, *Hydrastis canadensis* (goldenseal) extract, *Cyperus rotundus* extract, cayenne pepper extract, *Bergenia ligulata* extract, *Allium cepa* extract, *Schizandrae fructus* extract, ashwagandha extract, *Dioscorea villosa* (wild yam) extract, licorice extract, *Tanacetum parthenium* (feverfew) extract, comfrey bark extract, *Cissus quadrangularis* extract, *Carum carvi* L. (caraway) extract, St. john's wort extract, hesperdine extract and *Andrographis* paniculate extract are present in an amount 20.0 mg per kg weight of feed.

According to an embodiment herein, the plant extracts of sage leaf extract, water cress extract, ajwain extract, *Solanum nigrum* extract, *Asteracantha longifolia* extract, *moringa* extract, kale extract, shilajit extract, *Solanum glaucophyllum* extract, sea buck thorn extract, chia seeds extract, kelp extract, flax seed extract, *Kalanchoe pinnata* extract, *Picralima nitida* extract, elderberry extract, *Justicia adhatoda* extract, eyebright extract and parsley extract are present in an amount 20.0 mg per kg weight of feed.

According to an embodiment herein, the turmeric is present in an amount 2.0 grams per kg weight of feed.

According to an embodiment herein, the black pepper is present in an amount 200.0 mg per kg weight of feed.

According to an embodiment herein, the garlic is present in an amount 300.0 mg per kg weight of feed.

According to an embodiment herein, the methi is present in an amount 300.0 mg per kg weight of feed.

According to an embodiment herein, the jeera is present in an amount 300.0 mg per kg weight of feed.

According to an embodiment herein, the algal extracts are *chlorella* extract and *spirulina* extract.

According to an embodiment herein, the algal extract is present in an amount of 20 mg per kg of feed.

Experimental Details

The poultry herbal feed composition for producing eggs having high calcium content, comprises a combination of plant extracts, a combination of herbal extracts, a combination of pure spices, a combination of algal extracts and a Resveratrol grapeseed extract. The composition of the present study produces eggs from poultry layers that are highly rich in calcium content. The present study justifies the ability of poultry herbal feed composition to produce highly nutritious and high calcium containing eggs by poultry layers.

Processing of ingredients: All the ingredients of the poultry herbal feed composition were collected. All the ingredients are taken in powdered form. All the ingredients were mixed in proper ratio with poultry feed based on per kg weight of feed to obtain a final composition. Table 1 shows the poultry herbal feed composition according to the present invention.

TABLE 1

Ingredients used in said poultry herbal feed composition of present invention

| S. No | Ingredient(s) Name | Amount per kg weight of feed |
|---|---|---|
| | Plant extract in ratio 10:1 | |
| 1 | Sage leaf | 20 mg |
| 2 | Water cress | 20 mg |
| 3 | Ajwain | 20 mg |
| 4 | *Solanum nigrum* | 20 mg |
| 5 | *Asteracantha longifolia* | 20 mg |
| 6 | Moringa | 20 mg |
| 7 | Kale | 20 mg |
| 8 | Shilajit | 20 mg |
| 9 | *Solanum glaucophyllum* | 20 mg |
| 10 | Sea buck thorn | 20 mg |
| 11 | Chia seeds | 20 mg |
| 12 | Kelp | 20 mg |
| 13 | Flax seed | 20 mg |
| 14 | *Kalanchoe pinnata* | 20 mg |
| 15 | *Picralima nitida* | 20 mg |
| 16 | Elderberry | 20 mg |
| 17 | *Justicia adhatoda* extract | 20 mg |
| 18 | Eyebright extract | 20 mg |
| 19 | *Petroselinum crispum* (parsley) | 20 mg |
| | Herbal extracts in ratio 10:1 | |
| 20 | Mulethi | 20 mg |
| 21 | Oregano | 20 mg |
| 22 | Clove | 20 mg |
| 23 | Rosemary | 20 mg |
| 24 | *Thymus vulgaris* (thyme) | 20 mg |
| 25 | Green tea | 20 mg |
| 26 | *Cichorium intybus* (chicory) | 20 mg |
| 27 | *Berberis asiatica* | 20 mg |
| 28 | *Crinum jagus* | 20 mg |
| 29 | *Momordica charantia* | 20 mg |
| 30 | *Terminalia arjuna* (arjuna) | 20 mg |
| 31 | *Terminalia chebula* | 20 mg |
| 32 | Lemon grass | 20 mg |

TABLE 1-continued

Ingredients used in said poultry herbal feed composition of present invention

| S. No | Ingredient(s) Name | Amount per kg weight of feed |
|---|---|---|
| 33 | Tea tree | 20 mg |
| 34 | Cinnamon | 20 mg |
| 35 | Wild mint | 20 mg |
| 36 | Pepper mint | 20 mg |
| 37 | Quebracho tannin | 20 mg |
| 38 | Chest nut | 20 mg |
| 39 | Neem | 20 mg |
| 40 | Wood apple | 20 mg |
| 41 | Long pepper | 20 mg |
| 42 | Stevia | 20 mg |
| 43 | Humulus lupulus | 20 mg |
| 44 | Icariin | 20 mg |
| 45 | Giloy | 20 mg |
| 46 | *Lepidium sativum* (*chandrashoor*) | 20 mg |
| 47 | *Laurus nobilis* (bay leaf) | 20 mg |
| 48 | Marshmallow | 20 mg |
| 49 | Acacia nilotica | 20 mg |
| 50 | *Ganoderma lucidum* (reishi mushroom) | 20 mg |
| 51 | *Okro abelmoschus esculentus* (okra) | 20 mg |
| 52 | Onion | 20 mg |
| 53 | *Arbutus unedo* | 20 mg |
| 54 | *Uva ursi* | 20 mg |
| 55 | Pomegranate | 20 mg |
| 56 | *Pluchea lanceolata* (*rasna*) | 20 mg |
| 57 | *Hypecoum erectum L.* | 20 mg |
| 58 | *Ash gourd* (winter melon) | 20 mg |
| 59 | Dandelion | 20 mg |
| 60 | *Silybum marianum* (milk thistle) | 20 mg |
| 61 | *Boerhaavia diffusa* (*punarnava*) | 20 mg |
| 62 | *Ipomoea digitata* | 20 mg |
| 63 | *Phyllanthus niruri* | 20 mg |
| 64 | *Picrorhiza kurroa* | 20 mg |
| 65 | *Swertia chirayita* | 20 mg |
| 66 | *Eclipta alba* | 20 mg |
| 67 | *Hemidesmus indicus* | 20 mg |
| 68 | *Tephrosia purpurea* (*sarpunkha*) | 20 mg |
| 69 | *Fumaria indica* | 20 mg |
| 70 | *Symplocos racemose* | 20 mg |
| 71 | *Amorphophallus konjac* (*glucomannan*) | 20 mg |
| 72 | Sweet flag | 20 mg |
| 73 | Arjuna | 20 mg |
| 74 | Methi | 20 mg |
| 75 | Monacolin | 20 mg |
| 76 | Olive | 20 mg |
| 77 | *Cordyceps* | 20 mg |
| 78 | *Nigella sativa* (kalongi) | 20 mg |
| 79 | *Tinospora cordifolia* (guduchi) | 20 mg |
| 80 | *Juglans nigra* (black walnut) | 20 mg |
| 81 | Ginkgo (*ginkgo biloba*) | 20 mg |
| 82 | *Coriandrum sativum* (coriander) | 20 mg |
| 83 | *Leptadenia reticulata* (*jeevanthi*) | 20 mg |
| 84 | *Asparagus racemosus* (shatavari) | 20 mg |
| 85 | *Petroselinum crispum* (parsley) | 20 mg |
| 86 | *Chlorophytum borivilianum* (*safed musli*) | 20 mg |
| 87 | *Tribulus terrestric* | 20 mg |
| 88 | Saw palmetto | 20 mg |
| 89 | *Uraria picta* | 20 mg |
| 90 | *Cestrum diurnum* | 20 mg |
| 91 | *Vitex negundo linn.* | 20 mg |
| 92 | *Scutellaria baicalensis* | 20 mg |
| 93 | *Pinus densiflora* | 20 mg |
| 94 | *Allium tuberosum* | 20 mg |
| 95 | *Portulaca oleracea* | 20 mg |
| 96 | *Solanum xanthocarpum* | 20 mg |
| 97 | *Muira puama* | 20 mg |
| 98 | *Scutellaria baicalensis* (chinese skullcap) | 20 mg |
| 99 | *Apium graveolens* (celery) | 20 mg |
| 100 | *Cynara cardunculus* (artichoke) | 20 mg |
| 101 | *Medicago sativa* (alfalfa) | 20 mg |
| 102 | *Centella asiatica* (*gotu kola*) | 20 mg |
| 103 | Red spinach | 20 mg |
| 104 | Beetroot | 20 mg |
| 105 | *Carica papaya* | 20 mg |
| 106 | Capsicum annum | 20 mg |

TABLE 1-continued

Ingredients used in said poultry herbal feed composition of present invention

| S. No | Ingredient(s) Name | Amount per kg weight of feed |
|---|---|---|
| 107 | *Thuja occidentalis* | 20 mg |
| 108 | Euganol | 20 mg |
| 109 | *Mesua ferrea linn.* | 20 mg |
| 110 | Lavender | 20 mg |
| 111 | *Pimpinellaanisum* (anise) | 20 mg |
| 112 | *Anethum graveolens* (dill) | 20 mg |
| 113 | *Rhapidophyllum hystrix* (needle palm) | 20 mg |
| 114 | Black cardamom | 20 mg |
| 115 | *Echinacea purpurea* | 20 mg |
| 116 | Aloe vera | 20 mg |
| 117 | Tulsi | 20 mg |
| 118 | *Astragalus propinquus* | 20 mg |
| 119 | Dong quai | 20 mg |
| 120 | *Eugenia jambolana* | 20 mg |
| 121 | Nettle leaf | 20 mg |
| 122 | Worm wood | 20 mg |
| 123 | Nettle | 20 mg |
| 124 | *Propolis* | 20 mg |
| 125 | *Aralia racemosa* (*spikenard*) | 20 mg |
| 126 | *Scutellaria baicalensis* (*baikal skullcap*) | 20 mg |
| 127 | *Hydrastis canadensis* (*goldenseal*) | 20 mg |
| 128 | *Cyperus rotundus* | 20 mg |
| 129 | Cayenne pepper | 20 mg |
| 130 | *Bergenia ligulata* | 20 mg |
| 131 | *Allium cepa* | 20 mg |
| 132 | *Schizandrae fructus* | 20 mg |
| 133 | Ashwagandha | 20 mg |
| 134 | *Dioscorea villosa* (wild yam) | 20 mg |
| 135 | Licorice | 20 mg |
| 136 | *Tanacetum parthenium* (*feverfew*) | 20 mg |
| 137 | Comfrey bark | 20 mg |
| 138 | *Cissus quadrangularis* | 20 mg |
| 139 | *Carum carvi L.* (*caraway*) | 20 mg |
| 140 | St. john's wort | 20 mg |
| 141 | *Hesperdine* | 20 mg |
| 142 | *Andrographis paniculate* | 20 mg |
| | Pure herbs in ratio 10:1 | |
| 143 | Turmeric | 2 grams |
| 144 | Black Pepper | 200 mg |
| 145 | Garlic | 300 mg |
| 146 | Methi | 200 mg |
| 147 | Jeera | 300 mg |
| | Plant extract in ratio 100:1 | |
| 148 | Resveratrol grapeseed extract | 1.2 mg |

Material and Method: The major study was conducted and the obtained final herbal composition was mixed with feed of layer poultry birds. The fortified eggs hatched by layer poultry birds which were feed with said herbal composition were analysed. The egg quality or nutritional content of fortified raw eggs produced by layer poultry birds were compared with regular raw eggs produced by layer poultry before feeding them with herbal composition of present invention.

Sample collection: The raw egg samples were collected and analysed for egg quality and nutritional content.

Result and Discussion

Nutritional value analysis result of standard eggs: FIG. 1A shows nutritional value profile of conventional regular eggs laid by layers on standard feed without herbal composition, according to an embodiment of the present invention.

In first example, a standard fodder was provided to layer poultry birds. The standard fodder means feed without herbal composition of present invention. The eggs laid by layers after having standard fodder exhibited the nutritional information as shown in Table 2 below:

TABLE 2

| Nutritional information of eggs laid by layers on standard fodder (without herbal composition of said invention) | |
|---|---|
| Parameters | Test Result |
| Calcium, mg/100 g | 46.27 |
| Fat, % by wt. | 10.79 |
| Protein, % by wt. | 12.94 |
| Selenium, mg/kg | 0.38 |
| Copper, mg/kg | 1.57 |
| Vitamin D, mcg/100 g | 2.23 |
| Vitamin E (Alpha Tocopherol), mg/100 g | 1.12 |
| DHA (Docosahexaenic acid), mg/100 g | 8.74 |
| Omega 3 Fatty Acids, g/100 g | 0.09 |
| Omega 7 fatty acids, g/100 g | 0.31 |
| Beta carotene, mg/kg | 20 |
| Phosphorus, mg/kg | 0.15 |
| Progesterone, μg/kg | 32.04 |
| Testosterone, μg/kg | BLQ [0.5] |

Nutritional value analysis result of fortified eggs: Table 3 shows nutritional value profile of fortified eggs laid by layers on feed supplemented with the poultry herbal composition, according to an embodiment of the present invention.

In second example, a poultry herbal feed of present invention was mixed with standard feed based on per kg weight of feed and was provided to layer poultry birds. The fortified eggs laid by layers on feed supplemented with herbal composition of said invention exhibited the nutritional information as shown in Table 3 below:

TABLE 3

| Nutritional information of fortified eggs laid by layers on feed supplemented with herbal composition of said invention | |
|---|---|
| Parameters | Test Result |
| Calcium, mg/100 g | 114.0 |
| Iron, mg/100 g | 4.35 |
| Vitamin E, mg/100 g | 1.25 |
| Vitamin B6, mg/100 g | <0.1 |
| Vitamin D2, μg/100 g | <1.0 |
| Vitamin B12, μg/100 g | 1.49 |
| Vitamin A, IU/100 g | 392.98 |
| Vitamin D3, μg/100 g | <1.0 |
| Omega 6 fatty acids, g/100 g | 1.07 |
| Omega 9 fatty acids, g/100 g | 4.19 |
| Cholesterol, mg/100 g | 353.92 |

The fortified eggs laid by layers on feed supplemented with herbal composition of said invention exhibited higher nutritional value in comparison to standard raw eggs.

Comparative Analysis of Calcium Content in Fortified Eggs with Standard Eggs:

The calcium content of fortified eggs laid by layers after having fed fortified with herbal composition of present invention showed more than twice the amount of calcium present in standard eggs (i.e. eggs laid by layers after having standard feed without herbal composition). The comparative analysis data of calcium content in standard eggs and fortified eggs is depicted in Table 4 below:

TABLE 4

| Comparative analysis data of calcium content in standard eggs and fortified eggs | | |
|---|---|---|
| | Test result | |
| Parameter | Standard eggs (Without herbal composition) | Fortified eggs (With herbal composition) |
| Calcium, mg/100 g | 46.27 | 114.0 |

The fortified eggs laid by layers on feed supplemented with herbal composition of said invention showed more than twice the amount of calcium present in standard eggs (without herbal composition/supplement).

Microbial analysis result: Table 5 shows microbial analysis result of fortified eggs laid by layers on feed supplemented with herbal composition of said invention. The results shows absence of *Salmonella, Listeria monocytogenes, E. coli* and *Staphylococcus aureus* bacteria.

TABLE 5

| Microbiological Analysis result of fortified eggs | |
|---|---|
| *Salmonella* | Absent |
| *Listeria monocytogens* | Absent |
| *E. coli* | Absent |
| *Staphylococcus* | Absent |

CONCLUSION

The nutritional value especially the calcium content in eggs laid by layers on feed supplemented with herbal composition of said invention was investigated.

From a nutritional standpoint, calcium has an important role in several metabolic and structural functions. Calcium plays a role in strengthening bones and teeth; regulating muscle functioning, such as contraction and relaxation; regulating heart functioning; blood clotting; transmission of nervous system messages and enzyme function.

The present study revealed that herbal composition of present invention could be successfully utilized in poultry feeds to improve the nutritional value of eggs especially the calcium content in eggs.

The plant extracts and pure herbs used in said poultry herbal composition of present invention has unique nutritional benefits on human health. Herbal preparations help in the digestion process and being a component of nature, these preparations are considered safe, cost effective and environment friendly with no side effect. The mode of action of herbs and plant extracts has not been fully elucidated. However, most of the herbs exhibit antibacterial, coccidiostatic, anti-helminthic, anti-viral, anti-inflammatory or particularly, antioxidant properties. Herbs and spices can protect the feed against oxidative deterioration during storage.

The present study concluded that eggs laid by layers after feeding them with said herbal composition of present invention were found having higher calcium content in comparison to regular eggs. The calcium content was found more than twice the amount of calcium content present in regular standard eggs. The eggs produced by layers after feeding them with said herbal composition were found free from *E. coli, Listeria monocytogenes, Shigella, campylobacter, Staphylococcus aureus* and *Salmonella* bacteria as well as eggs produced were odourless.

It is possible to conclude that herbs and plant extracts used in poultry herbal composition of said invention is a promising product due to its diversity of phytochemicals (such as flavonoids, phenols, saponin, alkaloids etc.) and secondary metabolites that play important role in various metabolic process in humans.

The present invention provides a novel poultry herbal feed composition for layer poultry birds. The hatched eggs by layers after feeding them with poultry herbal composition of present invention were analysed for nutritional value. The eggs produced by layers after feeding them with said herbal composition were found having higher calcium content in comparison to regular eggs. The calcium content was found to be more than twice the amount of calcium present in conventional regular eggs.

The eggs produced by layers after feeding them with said herbal composition were found free from bad odour.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims presented in the complete specification or non-provisional application.

What is claimed is:

1. A herbal poultry feed composition for producing high calcium containing eggs, consisting of:

(a) a plurality of plant extracts, wherein the plurality of plant extracts are sage leaf extract, water cress extract, ajwain extract, *Solanum nigrum* extract, *Asteracantha longifolia* extract, *moringa* extract, kale extract, shilajit extract, *Solanum glaucophyllum* extract, sea buck thorn extract, chia seeds extract, kelp extract, flax seed extract, *Kalanchoe pinnata* extract, *Picralima nitida* extract, elderberry extract, *Justicia adhatoda* extract, eyebright extract, and parsley extract;

(b) a plurality of herbal extracts, wherein the plurality of herbal extracts are mulethi extract, oregano extract, clove extract, rosemary extract, *Thymus vulgaris* (thyme) extract, green tea extract, *Cichorium intybus* (chicory) extract, *Berberis asiatica* extract, *Crinum jagus* extract, *Momordica charantia* extract, *Terminalia arjuna* (*arjuna*) extract, *Terminalia chebula* extract, lemon grass extract, tea tree extract, cinnamon extract, wild mint extract, pepper mint extract, quebracho tannin extract, chest nut extract, neem extract, wood apple extract, long pepper extract, *stevia* extract, *Humulus lupulus* extract, icariin extract, giloy extract, *Lepidium sativum* (chandrashoor) extract, *Laurus nobilis* (bay leaf) extract, marshmallow extract, *Acacia nilotica* extract, *Ganoderma lucidum* (*reishi* mushroom) extract, Okro *Abelmoschus esculentus* (okra) extract, onion extract, *Arbutus unedo* extract, *Uva ursi* extract, pomegranate extract, *Pluchea lanceolata* (*rasna*) extract, *Hypecoum erectum* L. extract, ash gourd (winter melon) extract, dandelion extract, *Silybum marianum* (milk thistle) extract, *Boerhaavia diffusa* (*punarnava*) extract, *Ipomoea digitata* extract, *Phyllanthus niruri* extract, *Picrorhiza kurroa* extract, *Swertia chirayita* extract, *Eclipta alba* extract, *Hemidesmus indicus* extract, *Tephrosia purpurea* (sarpunkha) extract, *Fumaria indica* extract, *Symplocos racemose* extract, *Amorphophallus konjac* (glucomannan) extract, sweet flag extract, methi extract, monacolin extract, olive extract, *cordyceps* extract, *Nigella sativa* (kalongi) extract, *Tinospora cordifolia* (guduchi) extract, *Juglans nigra* (black walnut) extract, *ginkgo* (*Ginkgo biloba*) extract, *Coriandrum sativum* (coriander) extract, *Leptadenia reticulata* (jeevanthi) extract, *Asparagus racemosus* (shatavari) extract, *Petroselinum crispum* (parsley) extract, *Chlorophytum borivilianum* (safed musli) extract, *Tribulus terrestric* extract, saw palmetto extract, *Uraria picta* extract, *Cestrum diurnum* extract, *Vitex negundo* Linn. extract, *Scutellaria baicalensis* extract, *Pinus densiflora* extract, *Allium tuberosum* extract, *Portulaca oleracea* extract, *Solanum xanthocarpum* extract, *Muira puama* extract, *Scutellaria baicalensis* (chinese skullcap) extract, *Apium graveolens* (celery) extract, *Cynara cardunculus* (artichoke) extract, *Medicago sativa* (alfalfa), *Centella asiatica* (gotu kola) extract, red spinach extract, beetroot extract, *Carica papaya* extract, *Capsicum* annum extract, *Thuja occidentalis* extract, euganol extract, *Mesua ferrea* Linn. extract, lavender extract, *Pimpinella anisum* (anise) extract, *Anethum graveolens* (dill) extract, *Rhapidophyllum hystrix* (needle palm) extract, black cardamom extract, *Echinacea purpurea* extract, aloe vera extract, *tulsi* extract, *Astragalus propinquus* extract, dong quai extract, *Eugenia jambolana* extract, nettle leaf extract, worm wood extract, nettle extract, *propolis* extract, *Aralia racemosa* (spikenard) extract, *Scutellaria baicalensis* (baikal skullcap) extract, *Hydrastis canadensis* (goldenseal) extract, *Cyperus rotundus* extract, Cayenne pepper extract, *Bergenia ligulata* extract, *Allium cepa* extract, *Schizandrae fructus* extract, ashwagandha extract, *Dioscorea villosa* (wild yam) extract, liqorice extract, *Tanacetum parthenium* (feverfew) extract, comfrey bark extract, *Cissus quadrangularis* extract, *Carum carvi* L. (caraway) extract, St. john's wort extract, hesperdine extract, and *Andrographis paniculate* extract;

(c) a plurality of spices, wherein the spices are turmeric, black pepper, garlic, methi and jeera;

(d) a plurality of algal extracts, wherein the algal extracts are a *chlorella* extract and a *spirulina* extract; and (e) a resveratrol grape seed extract.

2. The herbal poultry feed composition according to claim 1, wherein each plant extracts is present in an amount of 20 mg per kg of feed.

3. The herbal poultry feed composition according to claim 1, wherein the herbal extracts are each present in an amount of 20 mg per kg of feed.

4. The herbal poultry feed composition according to claim 1, wherein the turmeric is present in an amount of 2 grams per kg feed.

5. The herbal poultry feed composition according to claim 1, wherein the black pepper is present in an amount of 200 mg per kg feed.

6. The herbal poultry feed composition according to claim 1, wherein the garlic, the methi and the jeera are each present in an amount of 300 mg per kg feed.

7. The herbal poultry feed composition according to claim 1, wherein each algal extract is present in an amount of 20 mg per kg of feed.

8. The herbal poultry feed composition according to claim 1, wherein the resveratrol grapeseed extract is present in an amount of 1.2 mg per kg of feed.

9. The herbal poultry feed composition according to claim 1, wherein the eggs produced from chickens who consume the feed of claim 1 are higher in calcium content in comparison to eggs produced from chickens who do not consume the feed of claim 1.

10. The herbal poultry feed composition according to claim 1, wherein the calcium content in eggs produced from chickens who consume the feed of claim 1 is more than twice the amount of calcium content in eggs produced from chickens who do not consume the feed of claim 1.

* * * * *